United States Patent
Diener

(10) Patent No.: US 9,808,967 B1
(45) Date of Patent: Nov. 7, 2017

(54) METHODS OF MAKING CONTINUOUS FIBER-POLYOLEFIN COMPOSITES

(71) Applicant: TDA Research, Inc., Wheat Ridge, CO (US)

(72) Inventor: Michael D Diener, Boulder, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 15/270,282

(22) Filed: Sep. 20, 2016

Related U.S. Application Data

(63) Continuation of application No. 14/852,020, filed on Sep. 11, 2015, now Pat. No. 9,518,171.

(51) Int. Cl.
| | | |
|---|---|---|
| *B29C 43/00* | (2006.01) |
| *B29K 307/04* | (2006.01) |
| *B29K 23/00* | (2006.01) |

(52) U.S. Cl.
CPC ........ *B29C 43/003* (2013.01); *B29K 2023/00* (2013.01); *B29K 2307/04* (2013.01)

(58) Field of Classification Search
CPC .............. B29C 43/003; B29K 2307/04; B29K 2023/00
USPC ....................................... 524/496
See application file for complete search history.

(56) References Cited

U.S. PATENT DOCUMENTS

| | | |
|---|---|---|
| 4,804,427 A | 2/1989 | Paul et al. |
| 5,409,763 A | 4/1995 | Serizawa et al. |
| 6,114,271 A | 9/2000 | Bilda et al. |
| 6,559,249 B2 | 5/2003 | Yang et al. |
| 6,635,728 B2 | 10/2003 | Liu |
| 6,794,032 B2 * | 9/2004 | Borgner .................. C08L 23/10 428/389 |
| 8,722,819 B2 | 5/2014 | Robert et al. |
| 8,877,834 B2 * | 11/2014 | Iwashita .................. C08L 23/02 523/205 |
| 2005/0287891 A1 | 12/2005 | Park |
| 2012/0295504 A1 | 11/2012 | Miyauchi et al. |

OTHER PUBLICATIONS

Longgui Tang, et al., Aqueous powder slurry manufacture of continuous fiber reinforced polyethylene composite, Polymer Composites, Apr. 1997, vol. 18, No. 2, pp. 223-231.
Mariana Etcheverry, et al., Glass fiber reinforced polyproplene mechanical properties enhanced by adhesion improvement, Materials, 2012, 5, pp. 1084-1113.
Qi Wang, et al., Catalytic grafting: a new technique for polymer-fiber composites I. Polyethylene-asbestos composities, 1992,J. of Applied Polymer Science, vol. 44, pp. 1107-1119.
Qi Wang, et al., Catalytic grafting: a new technique for polymer-fiber composites II. Plasma treated UHMPE . . . , 1992, J. of Applied Polymer Science, vol. 45, pp. 1023-1033.
Qi Wang, et al., Catalytic grafting: a new technique for polymer-fiber composites III . . . Kevlar fibers . . . , 1993, J. of Applied Polymer Science, vol. 48, pp. 121-136.
Daniel Bonduel, et al., Supported coordination polymerization: a unique way to potent polyolefin carbon nanotube nanocomposite, 2005, Chemical Communication, pp. 781-183.
Andreas Funck, et al., Polypropylene carbon nanotube composite by in situ polymerization, 2006, Composites Science and Technology, 67, pp. 906-915.
Steven M. Kurtz, UHMWPE Biomaterials Handbook, second ed., Elsevier, 2009, pp. 249-258.
Hamid Shaikh, et al., Progress in carbon fiber and its polypropylene- and polyethylene-based compsites, 2014, Polymer-Plastics Tech. and Eng., 53, pp. 1845-1860.

* cited by examiner

*Primary Examiner* — Michael M Bernshteyn
(74) *Attorney, Agent, or Firm* — Brian J. Elliott

(57) ABSTRACT

The present invention relates to a process for making polyolefin matrix composites reinforced with continuous carbon fibers. The polymer-fiber composite material comprises a plurality of continuous fibers; and a polyolefin matrix. The present invention also relates to articles of manufacture made substantially from polyolefin matrix composites reinforced with continuous carbon fibers as well as orthopedic implant devices having a wear surface, or bearing comprising a polyolefin matrix composite reinforced with continuous carbon fibers.

17 Claims, 9 Drawing Sheets

METHODS OF MAKING CONTINUOUS FIBER-POLYOLEFIN COMPOSITES

CROSS-REFERENCE TO RELATED APPLICATIONS

This Continuation application claims the benefit of U.S. Non-Provisional application Ser. No. 14/852,020, now U.S. Pat. No. 9,518,171, filed Sep. 11, 2015.

STATEMENT REGARDING FEDERALLY SPONSORED RESEARCH OR DEVELOPMENT

This invention was made using U.S. government funding through the U.S. National Institute of Arthritis and Musculoskeletal and Skin Diseases contract No. 1R43AR063535-01. The government has certain rights in this invention.

FIELD OF THE INVENTION

The present invention generally relates to polyolefin matrix composites reinforced with continuous carbon fibers, and a process for making them. The present invention also relates to articles of manufacture made substantially from polyolefin matrix composites reinforced with continuous carbon fibers. The invention further relates to orthopedic implant devices comprising a polyolefin matrix composite reinforced with continuous carbon fibers.

BACKGROUND OF THE INVENTION

Polyolefins have many outstanding characteristics, and are widely used in many applications. However, their yield strength and stiffness are relatively poor compared to other engineering materials. These properties are commonly enhanced in other polymers by forming a composite with high strength fibers. The outstanding specific strength and stiffness of carbon fibers has led to the wide use of carbon fiber—polymer matrix composites across a wide range of applications. However, polyolefins exhibit very weak interactions with carbon materials because they are free from polar groups and chemically inactive. Since melted polyolefins do not readily wet carbon fibers, voids can form in the composite during production. Additionally, very high molecular weight polyolefins, such as ultrahigh molecular weight polyethylene (UHMWPE) have very high viscosity melt states and do not readily impregnate the fibers even when melted. Moreover, the finished composite exhibits weak interactions between the carbon fibers and the polyolefin matrix.

One method for forming continuous fiber composites with polyolefins begins by making an aqueous slurry of the polyolefin powder and passing the fibers through the slurry (Tang et al., 1997). Alternately, the slurry can be impregnated into a web of fibers, as demonstrated for UHMWPE powder and carbon fibers (US 2005/0287891). The UHMWPE had a molecular weight (by convention the number average molecular weight) of $2.5 \times 10^6$ amu, which is a relatively low value for UHMWPE, and this lower molecular weight UHMWPE processes easier than the UHMWPE with a number average molecular weight of about $5 \times 10^6$ amu, which is desired for use in wear-resistant parts. The water is then removed by drying before pressing the composite article. This technique does not overcome the problem of poor fiber-matrix interaction, as illustrated by the loss of impact strength after carbon fiber addition relative to before carbon fiber addition in the slurry-impregnated example of US 2005/0287891 (see paragraph [0032], in US 2005/0287891).

High adhesion between carbon fibers and a thermoplastic resin (matrix resin) is needed for improved mechanical properties. Methods for increasing wettability, and therefore increasing the polymer-fiber adhesion, by functionalizing the surface of carbon fibers through plasma treatment, ozone treatment, or chemical etching have been used, but unfortunately these methods damage the carbon fibers. Also, many methods have been proposed for producing a modified resin by graft polymerizing a polymerizable monomer containing a polar functional group onto an olefin resin. For example, US 2012/0295504 teaches that carbon fiber—polyolefin composites may be made by modifying the polyolefin to include a monomer containing an ethylenic double bond, such as styrene, and then stacking alternate layers of carbon fiber cloth (or unitape) and the modified polyolefin/polyolefin blend and subsequently hot pressing. In this case, the modifications to the polyolefin alter the properties of the matrix in a potentially undesirable manner. For example, the wear resistance of UHMWPE is compromised when other polymers are grafted onto it, or it is blended with other polymers. Also, as described below, UHMWPE does not penetrate the carbon fiber cloth during hot pressing.

Another means of forming carbon fiber composites with mixed polyolefin and polyamide matrices is to pull or extrude continuous carbon fibers through a melted mixture of polyolefin and polyamide, then chopping the fiber/polymer blends transversely to the length of the fiber and compounding them into the final product. This technique, given in U.S. Pat. No. 5,409,763 and U.S. Pat. No. 6,794,032 for example, is not applicable to UHMWPE because the melt viscosity of UHMWPE is too high to be used in that manufacturing technique. Furthermore, since only a single fiber bundle is passed through the die at a time, assembling the coated fibers into a ply would require additional weaving after coating, which can damage the polymer coating due to the low hardness of most polymers.

U.S. Pat. No. 8,877,834 teaches that a melted blend of polyolefin and acid-modified polyolefin can be used to make composites that have good load transfer with carbon fibers previously coated with an amine-containing size. Again, the melt state of UHMWPE has too high of a viscosity to coat fibers during extrusion through a die. Furthermore, the addition of the acid-modified polyolefin may detrimentally affect the properties of the composite in comparison to the pure polyolefin, for example the wear resistance.

U.S. Pat. No. 4,804,427 teaches coating continuous carbon (or other) fibers with an epoxy resin and initiator, curing the epoxy, and then polymerizing a thermoplastic (including polybutadiene) in the presence of the cured epoxy-coated carbon fiber. Coating the fibers with uncured resin and then curing the resin significantly complicates processing and increases the composite cost. Furthermore, neither polyethylene nor polypropylene were contemplated, which are the most difficult polyolefin matrices to achieve load transfer to the fibers.

A few publications describe a method for anchoring catalysts on certain types of fibers, and polymerizing olefins. For example, Etcheverry and Barbosa (2012) treated relatively long glass fibers with methylalumoxane (MAO, a co-catalyst for polyolefin production from metallocene catalysts), and polymerized propylene with the treated fibers in a solvent. In this technique, the MAO requires hydroxyl groups on the fiber surface. While hydroxyl groups dominate glass fiber surfaces, they are largely not present on carbon fiber surfaces. Additionally, only a very thin coating of PP was obtained on the fibers. A similar catalytic grafting technique was also used to produce PE-coated asbestos, UHMWPE and Kevlar® fibers (Wang et al., 1992, 1992, and 1993). DuPont™ Kevlar® is an aromatic polyamide fiber. In this method, titanium chloride was decomposed on the fiber surface to make a Ziegler-type catalyst. The success of the polymerization varied according to the number of hydroxyl groups on the fiber surface; the UHMWPE and Kevlar® fibers were plasma-treated in order to introduce the necessary hydroxyl groups. The Kevlar® and asbestos fibers were short fibers (length not given, though), free to circulate through the solvent during catalyst deposition and polymerization. The UHMWPE monofilaments were tightly wound on high density polyethylene (HDPE) frames and fitted together in the reactor. While experimental detail is lacking, it appears as if the fibers were not removed from the frames before hot pressing with additional HDPE to form the composites. These methods have the disadvantage of requiring catalyst preparation for each polymerization. Furthermore, the metallic catalyst (and presumably co-catalyst) is retained in the composite, since it was covalently bonded to the fiber surface through the hydroxyl groups. Metal content in carbon fiber—polymer matrix composites would prevent their use in certain applications, including implanted biomaterials and ablative insulation for military reentry vehicles.

Olefins may be polymerized (in-situ) in the presence of very short, discontinuous high aspect ratio carbons, primarily carbon nanotubes and nanofibers. This is usually accomplished by a homogeneous molecular catalyst, and polyethylene is the most typical product (Bonduel et al., 2005; Park and Choi, 2009). Non-molecular Ziegler-Natta catalysts have also been deposited on the nanotubes for polyethylene growth (Amoli et al., 2011). Polypropylene (Funck and Kaminsky, 2007) nanocomposites have also been formed by this technique. The discontinuous reinforcements are isotropically distributed throughout the reaction vessel during polymerization, and rapidly moving as the solvent is stirred. This method is not applicable to continuous carbon fibers, which cannot be isotropically distributed in the reaction vessel, are essentially immobile compared to the solvent and its dissolved contents, and would rapidly wrap around a stirring shaft and/or become balled up during agitation.

Similarly, composites of UHMWPE with chopped carbon fibers have long been known, and were briefly marketed in the late 1970s as materials for wear surfaces in hip implants (reviewed in Kurtz, 2009). The material was known as Poly II, but its performance was quite poor due to a complete lack of binding between the matrix and the fibers. As the matrix was worn, the chopped fibers simply pulled out from the composite. Other work with discontinuous carbon fiber (chopped or vapor-grown nanofibers) reinforcements in polyethylene and polypropylene composites prepared by typical polymer compounding techniques (twin-screw extrusion, melt blending, etc.) was recently reviewed (Shaikh et al., 2014). All of these composites were formed by mechanical mixing of the UHMWPE with the chopped fibers, a method that is not applicable to continuous fibers.

These references contain at least one of the following limitations in regard to fiber-polyolefin composites, in particular for fiber-polyolefin composites used as a wear surface for medical implants: loss of impact strength of the composite relative to the pure polyolefin; poor polymer adhesion to the fibers; only short and discontinuous fibers can be used in the production methods; fibers are damaged during the composite preparation (for example etching, plasma, and the like); the olefin is chemically altered or blended with a second material and this leads to degradation of a desired mechanical property such as wear resistance; there is poor intermixing of polyolefin polymer chains and the fibers which leads to poor mechanical properties of the composite; or there is residual catalyst or metal content which is unacceptable for high purity applications (for example medical implants).

As such, there remains a need for a continuous fiber-reinforced polyolefin composite which has: an improved impact resistance for the composite relative to the pure polyolefin, a high wear resistance (in particular for use in medical implants), a high purity (having little residual metals left from the polymerization catalysts used to produce the polyolefins), long, continuous fibers and a high molecular weight polyolefin intimately intermixed with the long fibers that lack chemically bound polymerization catalysts, all which overcome the limitations of the prior art.

BRIEF SUMMARY OF THE INVENTION

The present invention relates to a composite material composed of continuous fibers, preferably carbon fibers, and a polyolefin matrix, preferably a polyethylene matrix. The composite is produced by polymerizing the polyolefin in the presence of the fibers. The composite material and articles made from the composite material demonstrates good load transfer between the fibers and the matrix. This can be observed by measuring the notched impact strength of composites with the fibers compared to the polymer without any fibers, or the polymer combined with non-continuous fibers or the fiber/polymer combinations described in the prior art. Thus, the present invention solves the limitations of the prior art by, in one embodiment, improving the strength of the material without sacrificing the durability of the original polymer material. The invention also describes methods to produce a composite material composed of continuous fibers and a polyolefin matrix having a high number average molecular weight and an improved notched impact strength. The composite materials of the present invention are useful for a variety of articles of manufacture; one non-limiting example is the wear surface of an orthopedic implant device.

This invention provides both a process for forming continuous fiber—polyolefin matrix composites by growing the polyolefin in the presence of the fibers, and the resulting composite material. The continuous fibers are placed in a reaction vessel. A solvent is added to the vessel. The solvent may contain the catalyst(s), optional co-catalysts, and monomers, or these may be added separately at later times. During polymerization, the polymer chains are intimately entwined with the fibers. After polymerization, the solvent, catalyst and co-catalyst (if present) are removed, and the composite can be cut and/or formed into products by techniques known in the art, such as compression molding, machining and the like.

The composition made by the process is a composite of continuous carbon fibers with a polyolefin matrix penetrating the carbon fibers or carbon fiber tows. As described in the Background to this invention, there are several established techniques for producing continuous carbon fiber—polyolefin matrix composites, though these methods either suffer from poor fiber-matrix adhesion or with use an impure polyolefin matrix. In contrast to those methods, the polymer chains of this method naturally grow in and around the fibers, penetrating the tows. Since the polyolefin chains are greatly entangled during their growth, they are not easily separated from the fibers. This results in carbon fiber—polyolefin matrix composites which (after consolidation by hot pressing) exhibit increased notched impact strength, increased yield strength and increased Young's modulus in comparison to neat polyolefins.

An embodiment of the invention is a polymer-fiber composite material, the composite material comprising: (a) a plurality of continuous fibers; and (b) a polyolefin matrix, wherein, the continuous fibers are not chemically attached to an olefin polymerization catalyst, and wherein, the polyolefin matrix comprises polyolefin polymer chains with a number average molecular weight of at least $1 \times 10^6$ amu, and wherein, the polymer-fiber composite has a notched impact strength greater than the notched impact strength of a neat polyolefin, wherein the neat polyolefin has an equivalent chemical composition and equivalent number average molecular weight as the polyolefin of the polyolefin matrix in the polymer-fiber composite material. Optionally, the continuous fibers are carbon fibers that are at least 2 inches long. Optionally, the polyolefin matrix comprises polyolefin polymer chains with a number average molecular weight of at least $4 \times 10^6$ amu. In a preferred embodiment the polyolefin matrix comprises polyethylene.

Another embodiment of the invention is an article of manufacture substantially comprising the polymer-fiber composite material above. Optionally, the article of manufacture has a majority of the continuous fibers that substantially traverse the length of the article of manufacture and the polyolefin matrix comprises polyethylene. In a preferred embodiment, the article of manufacture is the wear inert, or bearing for an orthopedic implant.

Another embodiment of the invention is a method of making a continuous fiber-reinforced polyolefin matrix composite, the method comprising: providing a reaction vessel; providing a plurality of continuous carbon fibers; providing a solvent; providing a polymerization catalyst; providing an acyclic olefin monomer; placing the plurality of continuous carbon fibers in the reaction vessel; adding the solvent, the polymerization catalyst and the acyclic olefin monomer in suitable amounts to the reaction vessel; providing appropriate temperature and pressure inside the reaction vessel to promote polymerization of the acyclic monomer; allowing sufficient time to elapse for the continuous fiber-reinforced polyolefin matrix composite to from; isolating the continuous fiber-reinforced polyolefin matrix composite from the solvent and its dissolved contents. Optionally, the method further comprises the steps of: providing a polymerization co-catalyst; and adding the polymerization co-catalyst to the reaction. In an optional embodiment, the size is removed from continuous carbon fiber cloth. In a preferred embodiment the acyclic olefin monomer is ethylene and the polyolefin matrix comprises polyethylene with a number average molecular weight of at least $1 \times 10^6$ amu, more preferably at least $4 \times 10^6$ amu. Additional optional steps include agitating the solvent in the reaction vessel during the step of allowing sufficient time to elapse for continuous fiber-reinforced polyolefin matrix composite to from; securing the continuous fibers to a fixed mount within the reaction vessel, wherein this step occurs prior to the step of adding of the solvent, the polymerization catalyst and the acyclic olefin monomer in suitable amounts to the reaction vessel; using compression molding to produce a finished part; affixing the finished part on an orthopedic implant device, wherein the finished part is the wear surface of the orthopedic implant device.

DETAILED DESCRIPTION OF THE INVENTION

Figure 1:
FIG. 1. The dried reaction product of growing the UHMWPE in the presence of a 2D $C_f$ mat.
Figure 2A:
FIG. 2A. Wet reaction product from polymerizing ethylene in the presence of a 1D $C_f$ mat (vertically aligned on the frame)
Figure 2B:
FIG. 2B. Wet reaction product from polymerizing ethylene in the presence of a 1D $C_f$ mat (vertically aligned on the frame), alternate angle view.
Figure 2C:
FIG. 2C. A section of the dried product, taken from the same material shown in FIG. 2A and FIG. 2B.

The summary of the invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, and article "comprising" (or "which comprises") component A, B, and C can consist of (i.e. contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

The term "continuous fibers" when used in the context of a finished composite article means the fibers are at least substantially the length of the finished composite article. The term "continuous fibers" is used in general it means at least two inches long, and preferably at least six inches long.

The term "polyolefin" means a polymer produced from a simple olefin (also called an alkene with the general formula $C_nH_{2n}$) as a monomer. Polyolefin is further defined below in the Detailed Description of the Invention.

The term "matrix" as in "polyolefin matrix" means the portion of the composite made by be network of polymer chains, typically molecularly intertwined polymer chains.

The term "number average molecular weight" has the meaning commonly recognized in the field of polymer science.

The term "notched impact strength" is a physical property that is determined using methods recognized in the field of polymer science, for example as described in F2231, "Standard Test Method for Charpy Impact Test.

The term "neat" as in "neat polyolefin" means the pure polyolefin without anything added to it.

A neat polyolefin has an equivalent chemical composition and number average molecular weight as the polyolefin of the polyolefin matrix in the polymer-fiber composite material when the neat polyolefin is made under analogous reaction conditions and generates an analogous polymer, having polymer chains with an analogous degree of polymerization.

The term "carbon fibers" is given the meaning understood in the art, and is further defined below.

The statement "the continuous fibers substantially traverse the length of the article of manufacture" means the majority of the fibers are at least as long as the shortest distance measuring across the article of manufacture.

The term "solvent" means any solvent into which the olefin monomer is soluble and with a boiling point above the desired temperature for polymerization (at the reaction pressure).

The term "polymerization catalyst" means any catalyst known to polymerize olefins from monomeric precursors, with or without a co-catalyst.

The term "polymerization co-catalyst" or "co-catalyst" means a material used in combination with a "polymerization catalyst" to promote the polymerization of olefins from monomeric precursors.

The term "tow" has the meaning used in the composites industry, wherein a "tow" is an untwisted bundle of continuous filaments, and it refers to man-made fibers, particularly carbon fibers (also called graphite). Tows are designated by the number of fibers they contain. For example, a 12K tow contains about 12,000 fibers.

The term "size" in reference to the fibers means a surface treatment that may modify the chemical or physical properties of the carbon fiber.

Likewise the term "de-size" means to remove any such surface treatment or surface layer on the carbon fibers. "Unsized" means the fibers never had a surface treatment added, or that any inherent surface has been modified or removed, typically by exposing the fibers to acid or boiling acetone, and the like.

One embodiment of the invention is a process for making a composite of continuous carbon fibers in a polyolefin matrix by polymerizing the olefin in the presence of the fibers, as well as the composite article made the by the process. Preferably, at least a portion of the fibers are submerged in a solvent into which the olefinic monomer is dissolved during polymerization. Preferably, the solvent, unpolymerized monomers, catalyst and co-catalyst (if used) are removed from the composite article as a step of the process.

Continuous carbon fibers are preferably at least substantially the length of the finished composite article, or in the alternative at least two inches long, and more preferably at least six inches long. The carbon fibers may be aligned in one direction, multiple directions or randomly. They may be woven in two or more dimensions. The fibers may consist of yarns, where each yarn contains thousands of individual fiber strands. The fibers may be uncoated (unsized), oxidized or a coating may be applied to increase fiber-matrix adhesion. The fibers may be derived from pyrolysis of polyacrylonitrile, pitch, rayon, cellulose-derived precursors, or other materials without limitation, so long as they are substantially carbon. Examples include fibers of the AS4 grade produced by Hexcel and Panex® 35 produced by Zoltek, but these examples are merely intended to illustrate types of carbon fiber and do not restrict the invention. Panex® 35 is a trademarked commercially available carbon fiber that has a tensile strength of 4137 MPa, and tensile modulus of 242 GPa, a density of 1.81 g/cc, and a carbon content of 95%.

Preferably, the olefin is an acyclic olefin. Examples of acyclic polyolefins include polypropylene, poly-1-butene, polyisobutylene, random copolymers or block copolymers of propylene with ethylene and/or 1-butene at any ratio, ethylene-propylene-diene terpolymers including 50 wt % or less of the diene component with any ratio between ethylene and propylene, polymethylpentene, random copolymers or block copolymers of ethylene or propylene with 50 wt % or less of a vinyl compound or the like, ethylene/vinyl chloride copolymers, ethylene/vinylidene chloride copolymers, ethylene/acrylonitrile copolymers, ethylene/methacrylonitrile copolymers, ethylene/vinyl acetate copolymers, ethylene/acrylamide copolymers, ethylene/methacrylamide copolymers, ethylene/acrylic acid copolymers, ethylene/methacrylic acid copolymers, ethylene/maleic acid copolymers, ethylene/methyl acrylate copolymers, ethylene/ethyl acrylate copolymers, ethylene/isopropyl acrylate copolymers, ethylene/butyl acrylate copolymers, ethylene/isobutyl acrylate copolymers, ethylene/2-ethylhexyl acrylate copolymers, ethylene/methyl methacrylate copolymers, ethylene/ethyl methacrylate copolymers, ethylene/isopropyl methacrylate copolymers, ethylene/butyl methacrylate copolymers, ethylene/isobutyl methacrylate copolymers, ethylene/2-ethylhexyl methacrylate copolymers, ethylene/maleic anhydride copolymers, ethylene/ethyl acrylate/maleic anhydride copolymers, ethylene/metal acrylate copolymers, ethylene/metal methacrylate copolymers, ethylene/vinyl acetate copolymers or saponified products thereof, ethylene/vinyl propionate copolymers, ethylene/glycidyl methacrylate copolymers, ethylene/ethyl acrylate/glycidyl methacrylate copolymers, ethylene/vinyl acetate/glycidyl methacrylate copolymers and other copolymers of ethylene or an α-olefin with a vinyl monomer; chlorinated polyolefins such as chlorinated polypropylene and chlorinated polyethylene, and fluorinated polyolefins such as fluorinated polyethylene and fluorinated polypropylene. More preferably, the olefin is ethylene, and the polymer is polyethylene with a $M_w$ greater than or equal to $4 \times 10^6$ amu, even more preferably greater than or equal to $5 \times 10^6$ amu.

The catalyst may be any catalyst known to polymerize olefins from monomeric precursors, with or without a co-catalyst. It may be heterogeneous or homogeneous. Preferred examples include a Ziegler catalyst, a Phillips catalyst, a metallocene, or a phenoxy-imine catalyst. Other catalysts, such as those described in U.S. Pat. No. 8,722,819, which is incorporated by reference herein, are also suitable since they are known to catalyze the polymerization of olefins. Especially preferred catalysts are those known to produce polyethylene with $M_w$ greater than or equal to $4 \times 10^6$ amu.

Ziegler catalysts are heterogeneous and generally consist of titanium supported on a magnesium chloride, magnesium oxide or aluminum oxide fine particle. Typically, a trisalkyl aluminum is used as a co-catalyst. Examples of Ziegler catalysts include those prepared by the methods given in U.S. Pat. No. 6,559,249 or U.S. Pat. No. 6,114,271, although many other methods for their preparation are known. An example of a co-catalyst is triethylaluminum, and a preferred example is triisobutylaluminum, although other alkyl aluminums including those with branched alkyl substituents and those with non-uniform alkyl substituents may also be used.

Other catalysts are known as metallocenes. Examples of metallocenes include bis(cyclopentadienyl)zirconium, bis(pentamethylcyclopentadienyl)zirconium, bis(cyclopentadienyl)titanium, bis(pentamethylcyclopentadienyl)titanium, bis(indenyl)zirconium dichloride, and bis(indenyl)zirconium dichlorides where the five-membered ring is substituted (particularly if the substituent is t-butyldimethylsiloxy-). Many other examples are known in the art, and the examples given do not restrict the invention.

The solvent can be any solvent into which the olefin monomer is soluble and with a boiling point above the desired temperature for polymerization (at the reaction pressure). Without wishing to be bound by theory, the solvent assists in maintaining a uniform and constant temperature during the typically exothermic olefin polymerization. Toluene is a preferred example due to the high solubility of most olefins, catalysts (particularly metallocenes and phenoxy-imine compounds) and co-catalysts, combined with its moderate boiling point (231.1 degrees Fahrenheit), low cost and low toxicity. Conversely, some catalysts are known to require a non-aromatic solvent for UHMWPE, as taught in U.S. Pat. No. 6,635,728. For these systems, preferred solvents include heptane or longer aliphatic liquids and mixtures thereof, though cyclohexane may also be used if the temperature for polymerization is sufficiently low. However, many other solvents are suitable including kerosene, and other aromatic solvents.

The properties of the polymer and the efficiency of the polymerization reaction vary according to the monomer(s), catalyst (and co-catalyst), solvent and reaction condition chosen. Higher purity monomers and solvents are preferred for more uniform products and improved polymer yields.

In one procedure that is an embodiment of the invention, continuous carbon fibers are submerged in a solvent contained within a reactor vessel, catalyst (and co-catalyst) are added, monomers are added, the reaction vessel is brought to the desired reaction temperature and pressure and held there for a desired length of time. Preferably, the liquid contents in the tank may be agitated to improve uniformity of the product. After the desired reaction time, the pressure is normalized, and the fiber-polymer product is separated from the solvent, and any residual catalyst (co-catalyst) and monomer dissolved in the solvent. The fiber-polymer product may be removed by a solid/liquid separation means including decanting the liquid, filtering the solid from the liquid using a membrane, a mesh, a screen or the like, or removal of the solid product be removing the attached frame, if a frame was used to originally support the continuous fibers. The fiber-polymer composite can optionally, but preferably, be washed with additional solvent to remove residual catalyst (co-catalyst) and monomer, and then dried to remove residual solvent.

In another procedure that is an embodiment of the invention, continuous carbon fibers are secured to a frame, and submerged in a solvent contained within a reactor vessel. The frame is essentially inert during the polymerization, and the fibers are held such that they do not become entangled during agitation of the solvent. The frame is preferably attached to the inside surface of the reactor vessel, or otherwise immobilized within the reaction vessel. For this embodiment, agitation is preferably performed through stirring of the solvent. The fibers remain in a fixed geometry while the liquid fraction of the reaction media may move around, over and through the fibers. Catalyst (and co-catalyst if used) and monomer are added and the reaction vessel is brought to the desired operating temperature and pressure. After the desired reaction time, the pressure is normalized, and the fiber-polymer product is separated from the solvent (optionally by extracting the frame from the reaction vessel, draining the attached reaction product of excess liquid and separating the reaction product from the frame). The fiber-polymer composite can optionally but preferably washed with additional solvent to remove residual catalyst (co-catalyst) and monomer, and then dried to remove residual solvent.

In a preferred procedure, continuous carbon fibers at least 2 inches long are secured to an aluminum frame, which is held securely within a reaction vessel. Under inert atmosphere, a thoroughly anhydrous and deoxygenated solvent is added to completely cover the carbon fibers. Catalyst (and co-catalyst) may be present in the solvent as it is added, or may be added to the reaction vessel after the solvent. The catalyst (and optional co-catalyst) are dispersed in the reaction vessel by stirring the solvent. The reaction vessel and its contents are then brought to the desired reaction temperature. Monomer is then added to the tank up to the desired reaction pressure, and polymerization occurs with stirring for the desired reaction time. After the reaction time has ended, the fiber-polymer product is separated from the solvent (optionally by extracting the frame from the reaction vessel, draining the attached reaction product of excess liquid and separating the reaction product from the frame), monomer and catalyst. Preferably, the fiber-polymer product is washed with clean solvent (which may be different from the first solvent) to obtain a more purified fiber-polymer product.

In a highly preferred procedure, 4-inch or longer continuous carbon fibers that were originally manufactured to have a sizing that is compatible with epoxy matrices, but which has been removed in a de-sizing step, are secured to an aluminum frame and inserted in a reaction vessel. The fibers may be woven by any known two-dimensional weave, or they may be aligned in one direction. Under inert atmosphere, a thoroughly anhydrous and deoxygenated solvent is added to completely cover the carbon fibers. A single-site metallocene or phenoxy-imine catalyst and trialkyl aluminum co-catalyst may be present in the solvent as it is added, or may be added to the reaction vessel after the solvent. The catalyst and co-catalyst are dispersed in the reaction vessel by stirring the solvent. Ethylene is added to the reaction vessel and a pressure between 1.1 bar and 4 bar is maintained for between one and four hours at a temperature between 15 and 30° C. After the reaction time, the pressure is released from the reaction vessel, the frame containing the carbon fibers and polyethylene is removed from the vessel, and the fiber-polymer product is washed with clean solvent to remove residual catalyst and co-catalyst.

Figure 4:
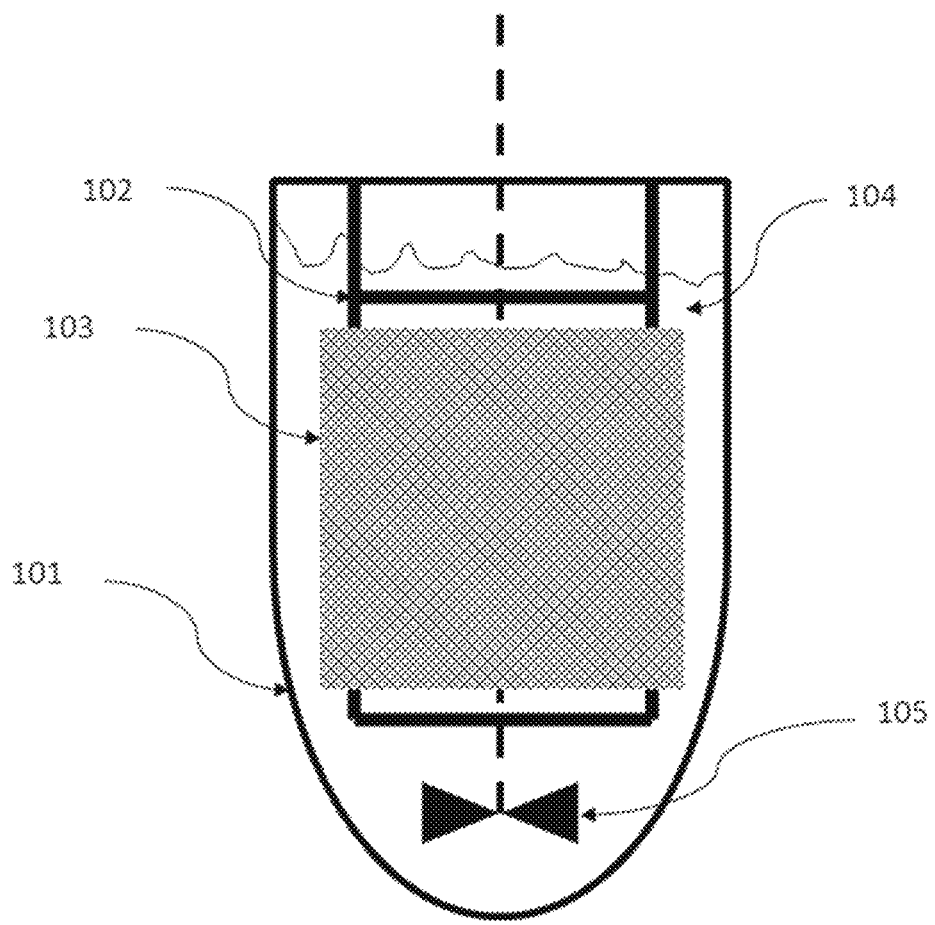
FIG. 4. Schematic of an apparatus.

An apparatus suitable for performing the highly preferred procedure is shown in FIG. 4. A reaction vessel (101) that can maintain substantially gas tight seals, known to be useful for polyolefin production, is used. A frame (102), with a piece of continuous carbon fiber cloth or unidirectional tape (103) secured to it, is suspended in the reaction vessel (101). Solvent (104) in the reaction vessel contains the catalyst, co-catalyst, and dissolved olefin monomer. The continuous carbon fibers (103) are immersed in the solvent (104). Fibers that are not immersed in the solvent will not be covered with polyolefin. An impeller (105) is used to agitate the solvent and its contents, thereby promoting more uniform polymer growth.

In another highly preferred procedure, continuous carbon fibers at least 4 inches in length, freed from sizing that is compatible with epoxy matrices, are secured to an aluminum frame. The fibers may be woven by any known two-dimensional weave, or they may be aligned in one direction. Under inert atmosphere, a thoroughly anhydrous and deoxygenated aliphatic alkyl solvent with a boiling point of at least 70° C. is added to completely cover the carbon fibers. A Ziegler catalyst and trialkyl aluminum co-catalyst may be present in the solvent as it is added, or may be added to the reaction vessel after the solvent. The catalyst and co-catalyst are dispersed in the reaction vessel by stirring the solvent. Ethylene is added to the reaction vessel and a pressure between 1.1 bar and 10 bar is maintained for between one and four hours at a temperature between 50 and 100° C. Even more preferably, the temperature is between 70 and 80° C. and the pressure is between 4 and 5 bar. After the reaction time, the pressure is released from the reaction vessel, the frame containing the carbon fibers and polyethylene is removed from the vessel, and the fiber-polymer product is washed with clean solvent to remove residual catalyst and co-catalyst.

The apparatus for performing the procedure consists of a reaction vessel lined with a material that is inert to the reaction, the catalyst and the co-catalyst used. The reaction vessel can be made airtight, and is capable of withstanding the pressure and temperature of the reaction without participating in the reaction or deforming. The reaction vessel (or its lid) has ports, or other suitable means to transfer contents to the inside, for adding solvent, catalyst, and monomer. Optionally, access ports are also present for measuring the pressure and temperature of its contents. Preferably, the vessel is jacketed or submerged in a fluid that maintains temperature in the vessel during the polymerization reaction. Polymerization of olefins is typically exothermic, and more uniform products will be obtained if the temperature of the solvent is held constant during the reaction time.

The composition made by this process is a composite of continuous carbon fibers with a polyolefin matrix penetrating the fiber tows. The fibers may be woven or substantially unidirectional. Preferably, the polyolefin is polyethylene, and more preferably the ethylene is a UHMWPE with a $M_w$ greater than $4 \times 10^6$ amu, most preferably $M_w$ greater than $5 \times 10^6$ amu. Preferably, the composite is free from solvent and residual catalyst and co-catalyst. Preferably, there are less than 200 mg Ti/kg UHMWPE, less than 500 mg Al/kg UHMWPE and less than 300 mg Cl/kg UHMWPE. More preferably, there are less than 100 mg Ti/kg UHMWPE, less than 100 mg Al/kg UHMWPE and less than 100 mg Cl/kg UHMWPE. Most preferably (equal to ASTM F648 values for UHMWPE implants), residual impurity levels are [[<]] less than 40 mg Ti/kg UHMWPE, less than 20 mg Al/kg UHMWPE, less than 5 mg Ca/kg UHMWPE and less than 30 mg Cl/kg UHMWPE. Preferably, the as-prepared and washed composite is formed to a dense, multi-ply composite by stacking several layers and consolidating the layers. Various techniques for consolidation of composites are known to those skilled in the art of composite formation. Preferably, the plies are consolidated by hot pressing. Optionally, additional polyolefin powder, like or dislike the polyolefin entangling the fibers, may be added during hot pressing to adjust the ratio of polyolefin to fiber in the finished article. When the polyolefin entangled the carbon fibers is UHMWPE, the added polymer is preferably also UHMWPE, which may be obtained from a neat polymer synthesis, purchased from a vendor, or culled from the reaction vessel.

Although a wide range of potential uses for the process and material produced thereof are envisioned, they are useful for improving the wear surface of joint implants. UHMWPE has long been used as the wear surface in artificial hips and knees, since it is highly wear-resistant. However, UHMWPE is subject to creep and fracture, particularly after irradiation (which is done to sterilize the implant, and to increase cross-linking, further enhancing the wear-resistance of the implant but increasing brittleness). Since good load transfer is achieved between the fibers and the matrix of this invention without blending a less wear-resistance polymer in with the UHMWPE, the process and materials formed by the process are expected to provide joint implants with superior resistance to creep deformation and fracture, while retaining the excellent wear resistance of UHMWPE.

The following examples are given to demonstrate the practice and advantages of the invention. They are provided as a means of illustration and are not intended to limit the specification or the claims that follow in any manner.

Example 1

A 13.5" long strip of (de-sized and oxidized) 6" wide plain weave carbon fiber fabric was secured to an aluminum frame and placed in a 5 L glass reactor. The aluminum frame consists of two thin rings, vertically spaced 6" by thin aluminum rods, which also mount to the lid of the reactor in order to secure the frame in place. The reactor was fitted with a stirrer paddle and a septum and connected to a gas manifold that has a three-way valve connected to both vacuum and argon. The vessel was sealed and subjected to three evacuate/refill cycles to introduce an inert atmosphere. It was then filled with 3 L of anhydrous toluene. A solution of 180 mg (0.15 mmol) of the phenoxy-imine catalyst $[F_5I_2\text{-FI}]_2\text{TiCl}_2$ (Weiser and Mulhaupt, 2006) in 50 mL of anhydrous toluene was added to the reactor, followed by 100 mL (150 mmol; 1000:1 Al:Ti) of a solution of methylaluminoxane (10 wt % in toluene). Under argon flow, the septum was exchanged for a Teflon® stopper. Teflon® is a trademarked name for the polymer material polytetrafluoroethylene. After 5 min of stirring with the catalyst mixture, the vessel was pressurized to 1.7 bar with ultrahigh purity ethylene (10 psig). The polymerization was allowed to proceed for 60 to 120 min. Then the pressure was released, the vessel opened to air, and the catalyst quenched by the slow addition of 25 mL of 1.25 M HCl in methanol. The continuous carbon fibers, covered with polyethylene, were removed from the vessel by lifting the frame from the solvent, separated from the frame, and washed with ~200 mL of acetone. After briefly drying, it was rinsed repeatedly in methanol for 1 h and allowed to air dry overnight. The solid was then dried to a constant mass under vacuum. The carbon fiber ($C_f$) cloth is substantially coated with white UHMWPE (as shown in FIG. 1), which also penetrates the fiber tows. Viscometry in decalin of a sample of the adventitious UHMWPE was measured using an Ubbelohde #1 viscometer, and the Mark-Houwink relationship was used to obtain a molecular weight of $5 \times 10^6$ amu.

Example 2

Figure 3:
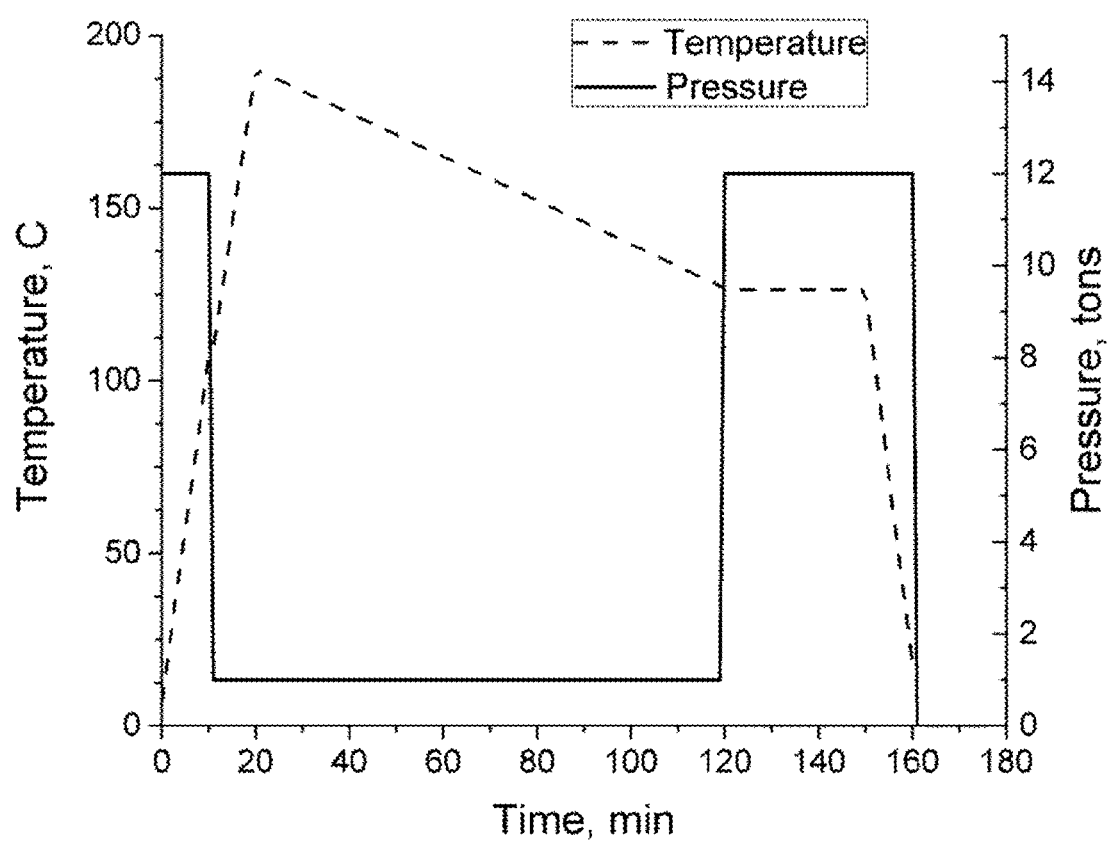
FIG. 3. Hot pressing cycle for the disks.

Compression molding was then used to form the fiber/polymer composites made as in Example 1 into disks. A ½"

thick aluminum plate was set on the lower platen of a hot press. A piece of mylar was placed on top of the Al plate, and then an aluminum ring of the desired diameter and thickness set on top of the mylar. The material to be pressed was placed in the ring. A second piece of mylar was set on top of the material to be press, and a second ½" thick plate of aluminum on top of that. The disks/cylinders were formed using the cycle shown in FIG. 3.

The composite disks were made by alternating layers of $C_f$/FI-UHMWPE from our reactor with GUR 4150 powder in order to achieve the desired weight percentage of $C_f$. The 6" strips of 2D-$C_f$/FI-UHMWPE (made as described in Example 1) were cut into 6" or 3.75" diameter disks. For the 3.75"×0.125" composite disks, four $C_f$/FI-UHMWPE disks were cut from the 6" strip, weighing 7.0 g. First, 2.8 g of commercial GUR 4150 powder (Ticona) was spread evenly on the mylar inside of the 3.75" Al ring, and then a $C_f$/FI-UHMWPE cut disk was placed on top. Another 2.8 g of 4150 was spread on top of the cut disk, and then another cut disk was added, so that the fibers aligned with those of the first disk. This was repeated twice more, and then a final 2.8 g of 4150 was added on top before the upper piece of mylar. This resulting disk therefore weighed ~21 g, and was ca. 18 wt. % $C_f$ in four plies. A similar procedure was followed for the 6"×0.625" disks, except that only two plies were used, resulting in a ca. 15 wt. % $C_f$ composite. The composite disks can then be cut into the desired shapes.

Comparative Example 3

Compression molding was performed as described in Example 2, except that only GUR 4150 UHWMPE powder was used. No $C_f$ or $C_f$/FI-UHMWPE was present. 20.5 g of 4150 was used for a 3.75" and 30 g for the 6" disk.

Comparative Example 4

Compression molding was performed as described in Example 2, except that only GUR 4150 was used with carbon fibers. No polyethylene was grown on the fibers; the fibers were merely laid in the mold in between additions of 4150 powder so that there was an even amount of 4150 between each piece of carbon fiber cloth. After pressing, the resulting disks were cut with a bandsaw or a knife. In both cases, the material delaminated severely during cutting, showing very little penetration of the $C_f$ cloth by the UHMWPE during hot-pressing.

Example 5

Some disks made by the procedures given in Example 2 and Comparative Example 3 were sealed under argon and gamma-irradiated to a dose of 106 kGy. The disks were then remelted at 150° C. for two hours under argon.

Example 6

The 3.75" disks were cut into specimens and notched according to ASTM F2231, "Standard Test Method for Charpy Impact Test on Thin Specimens of Polyethylene Used in Pressurized Pipes." $C_f$-reinforced disks were cut such that the impact occurred at ±45° to the $C_f$. The breaking energy and impact strength of four bars was measured for each composition and reported in Table 1. The $C_f$-reinforced composites did not break, even with the maximum weights available with our test instrument.

TABLE 1

Impact strength test results (± standard deviation).

| Sample | A | B | C | D | E |
|---|---|---|---|---|---|
| Breaking Energy (J) | 5.914 ± 0.566 | 5.425 ± 0.614 | 4.499 ± 0.667 | >18.39 | >18.39 |
| Impact Strength (kJ/m²) | 183.9 ± 15.4 | 158.1 ± 18.5 | 117.8 ± 16.63 | >521.9 | >521.9 |

Sample A: un-irradiated 4150 polymer.
Sample B: irradiated 4150 polymer (100 kGy irradiation)
Sample C: irradiated FI-UHMWPE prepared material (100 kGy irradiation).
Sample D: un-irradiated carbon fiber/FI-UHMWPE prepared composite, using 4150 polymer as interfacial bonding material between layers during hot pressing.
Sample E: irradiated carbon fiber/FI-UHMWPE prepared composite, using 4150 polymer as interfacial bonding material between layers (100 kGy irradiation).

Example 7

The 6" diameter disks were cut into Type I specimens (with shorter grip areas) and tested according to ASTM D638 "Standard Test Method for Tensile Properties of Plastics." The $C_f$-containing disks were cut such that the axis of tension was at ±45° to the fibers. The results, shown in Table 2, demonstrate that the $C_f$/FI-UHMPWE composites prepared by polymerizing the ethylene in the presence of the $C_f$ have load transfer between the fiber and the UHMWPE matrix, causing a 35% increase in modulus and a 64% increase in yield strength for the irradiated materials, and a 14% increase in modulus and a 41% increase in yield strength versus unirradiated neat 4150. FI-UHMWPE samples did not show an obvious yield point; strengths given are ultimate strengths from engineering stresses, which are closely related to the yield strength.

TABLE 2

Tensile test results shown as ± standard deviation.

| Sample | A | B | C | D | E |
|---|---|---|---|---|---|
| Tensile Modulus (GPa) | 1.00 ± 0.04 | 0.830 ± 0.019 | 1.09 ± 0.02 | 1.14 ± 0.09 | 1.12 ± 0.09 |
| Yield Strength (MPa) | 20.0 ± 0.8 | 17.9 ± 0.4 | 21.3 ± 0.9* | 28.2 ± 0.8 | 29.3 ± 3.1 |
| Strain to Yield (%) | 11.2 ± 0.9 | 11.1 ± 0.2 | * | 11.0 ± 1.6 | 11.9 ± 1.2 |

Sample A: un-irradiated 4150 polymer.
Sample B: irradiated 4150 polymer (100 kGy irradiation)
Sample C: irradiated FI-UHMWPE prepared material (100 kGy irradiation).
Sample D: un-irradiated carbon fiber/FI-UHMWPE prepared composite, using 4150 polymer as interfacial bonding material between layers during hot pressing.
Sample E: irradiated carbon fiber/FI-UHMWPE prepared composite, using 4150 polymer as interfacial bonding material between layers (100 kGy irradiation).

Example 8

Figure 5:
FIG. 5. Cross section of an axially symmetric acetabular bearing.
Figure 6:
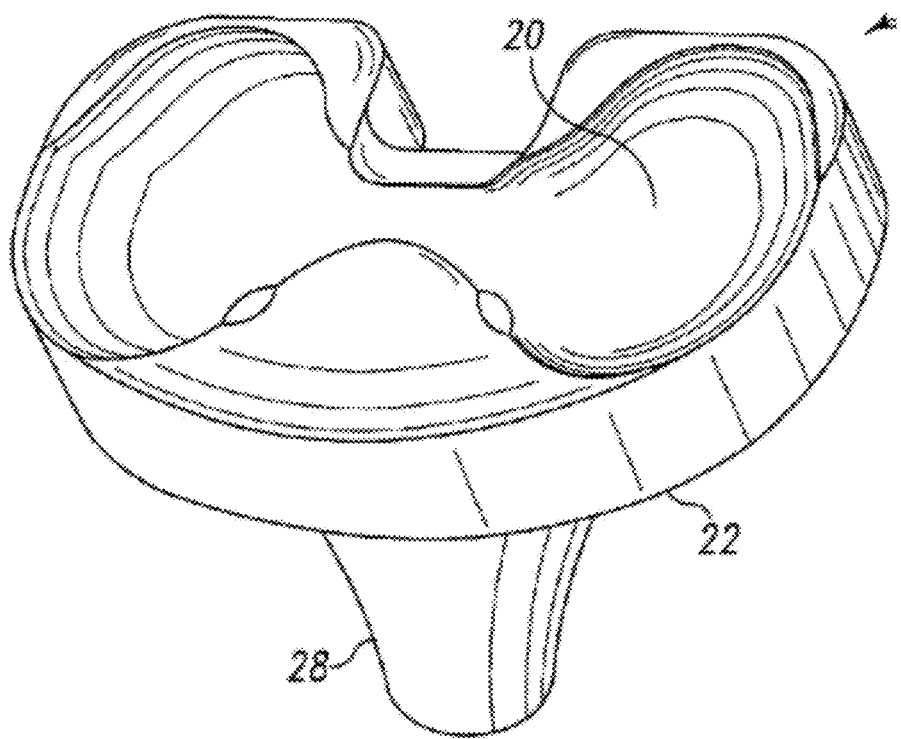
FIG. 6. Line drawing of a tibial bearing showing depressions (20) for the fibular condyles in the tibular tray (22). The upper UHMWPE part is typically cemented to a metallic tray back that includes a stem (28) for securing the assembly in the tibula.
Figure 7:
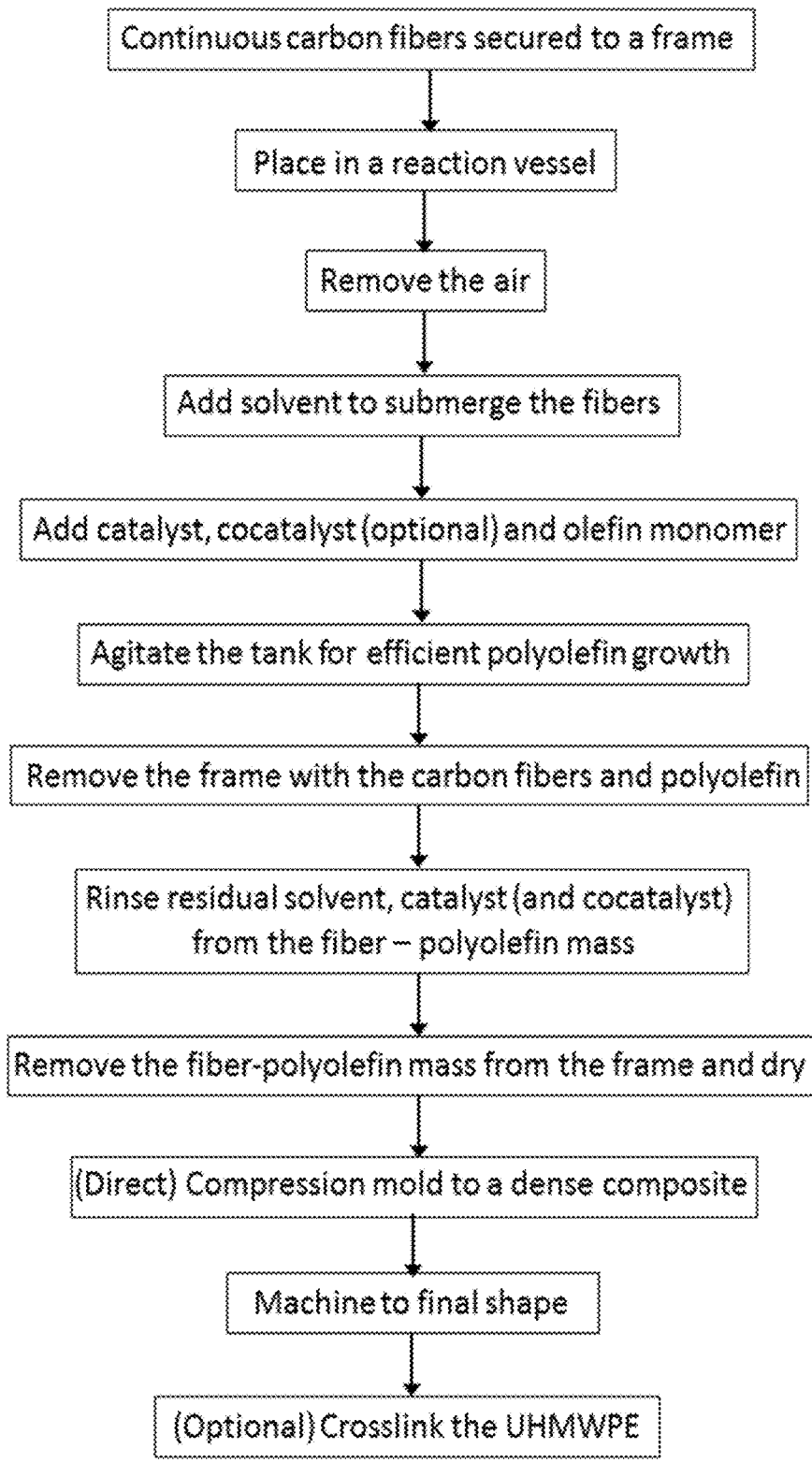
FIG. 7. Flowchart of a method of the present invention

The $C_f$/UHMWPE composite material that is the subject of this invention may be used to form implantable prosthetic bearings. The general shape of acetablular and tibial bearings is shown in FIGS. 5 and 6, respectively. Optimum shapes for the prosthetic bearings are understood by a Person Having Ordinary Skill In The Art. In principle, the $C_f$/UHMWPE composites can be used for any of these shapes.

In one method, sheets of $C_f$/UHMWPE were hot pressed using the cycle shown in Example 2 to obtain a cylinder that is slightly thicker and wider than necessary for the implant. The cylinder was then machined on a programmable lathe in order to produce an acetabular bearing of the general shape shown in FIG. 6. Features to accommodate a locking mechanism into the acetabular shell were milled into the backside. The technique leaves carbon fibers exposed at the wear surface.

In another method, sheets of C$_f$/UHMWPE were cut and set on top of a mold with a hemispherical cavity, such that the radius of the hemispherical cavity has the dimensions of the acetabular shell. The second part of the mold, a hemisphere whose radius corresponds to the desired inner radius of the acetabular cup, was then placed on top of the C$_f$/UHMWPE sheets and aligned with the hemispherical cavity. The assembly was performed in a hot press, and pressed to form a composite bearing. This technique, known as "direct compression molding," still requires some machining on the outer surface in order to provide features for attachment to the acetabular shell. However, the inner wear surface does not have exposed carbon fibers, but is rather a smooth UHMWPE surface.

The formed and/or machined composite article was then irradiated and remelted as discussed in Example 5. However, many other procedures for cross-linking UHMWPE are known in the art, and may be used instead.

What is claimed is:

1. A method of making a continuous fiber-reinforced polyolefin matrix composite, the method comprising:
    (a) providing a reaction vessel;
    (b) providing a plurality of continuous carbon fibers;
    (c) providing a solvent;
    (d) providing a polymerization catalyst;
    (e) providing an acyclic olefin monomer;
    (f) placing the plurality of continuous carbon fibers in the reaction vessel;
    (g) adding the solvent, the polymerization catalyst and the acyclic olefin monomer to the reaction vessel;
    (h) providing temperature and pressure inside the reaction vessel to promote polymerization of the acyclic olefin monomer to form a polyolefin matrix; and
    (i) isolating the continuous fiber-reinforced polyolefin matrix composite from the solvent and its dissolved contents.

2. The method of claim 1, further comprising the steps of:
    (j) providing a polymerization co-catalyst; and
    (k) adding the polymerization co-catalyst to the reaction vessel.

3. The method of claim 1, wherein the continuous carbon fibers are pretreated by immersion in a strong oxidizing acid selected from the group consisting of nitric acid, sulfuric acid, phosphoric acid or sulfonic acid, and rinsed to remove the strong oxidizing acid.

4. The method of claim 1, wherein the acyclic olefin monomer is ethylene and the polyolefin matrix comprises polyethylene with a number average molecular weight of at least $1 \times 10^6$ amu.

5. The method of claim 4, wherein the acyclic olefin monomer is ethylene and the polyolefin matrix comprises polyethylene with a number average molecular weight of at least $4 \times 10^6$ amu.

6. The method of claim 1, further comprising the step of:
    (l) securing the continuous fibers to a mount within the reaction vessel, wherein this step occurs prior to the step of (g) adding the solvent, the polymerization catalyst and the acyclic olefin monomer to the reaction vessel.

7. The method of claim 1, further comprising the step of:
    (m) agitating the solvent in the reaction vessel during the step of providing temperature and pressure inside the reaction vessel to promote polymerization of the acyclic olefin monomer to form a polyolefin matrix.

8. The method of claim 1, further comprising the step of:
    (n) using compression molding to produce a compression molded part.

9. The method of claim 8, further comprising the step of:
    (p) affixing the compression molded part on an orthopedic implant device, wherein the compression molded part is a bearing of the orthopedic implant device.

10. The method of claim 8, further comprising the step of:
    (p) crosslinking the polyolefin matrix.

11. The method of claim 10, further comprising the step of:
    (q) using gamma irradiation to induce crosslinking.

12. The method of claim 10, further comprising the step of:
    (r) further machining the compression molded part to form a molded and machined part.

13. The method of claim 12, further comprising the step of:
    (s) using the molded and machined part in an orthopedic implant device.

14. The method of claim 8, further comprising the step of:
    (t) further machining the compression molded part to form a molded and machined part.

15. The method of claim 14, further comprising the step of:
    (u) using the molded and machined part in an orthopedic implant device.

16. The method of claim 8, further comprising the step of:
    (v) adjusting the mass ratio of continuous carbon fibers to polymer by adding additional neat polymer to the continuous fiber-reinforced polyolefin matrix composite from step (i) before the step of (n) using compression molding to produce a compression molded part.

17. The method of claim 8, further comprising the step of:
    (w) adjusting the mass ratio of continuous carbon fibers to polymer by removing adventitious polymer from the continuous fiber-reinforced polyolefin matrix composite from step (i) before the step of (n) using compression molding to produce a compression molded part.

* * * * *